(12) United States Patent
Khan et al.

(10) Patent No.: US 8,530,034 B2
(45) Date of Patent: Sep. 10, 2013

(54) ROOFING PRODUCTS INCLUDING GRANULES WITH REFLECTIVE COATING

(75) Inventors: Amir Khan, Wayne, NJ (US); Michael D. De Souto, Somerset, MA (US)

(73) Assignee: Building Materials Investment Corporation, Wilmington, DE (US)

( * ) Notice: Subject to any disclaimer, the term of this patent is extended or adjusted under 35 U.S.C. 154(b) by 1460 days.

(21) Appl. No.: 11/473,168

(22) Filed: Jun. 22, 2006

(65) Prior Publication Data
US 2006/0240224 A1      Oct. 26, 2006

Related U.S. Application Data

(63) Continuation-in-part of application No. 10/851,602, filed on May 21, 2004.

(51) Int. Cl.
| | |
|---|---|
| D06N 7/04 | (2006.01) |
| G11B 5/64 | (2006.01) |
| E01F 9/04 | (2006.01) |
| B32B 5/16 | (2006.01) |
| B32B 27/32 | (2006.01) |
| B32B 27/30 | (2006.01) |

(52) U.S. Cl.
USPC ........... 428/143; 428/141; 428/323; 428/521; 428/522; 428/523

(58) Field of Classification Search
USPC .................................................. 428/141, 143
See application file for complete search history.

(56) References Cited

U.S. PATENT DOCUMENTS

| | | | |
|---|---|---|---|
| 3,208,871 A * | 9/1965 | Langseth et al. | 428/145 |
| 3,507,676 A * | 4/1970 | McMahon | 428/145 |
| 7,422,989 B2 * | 9/2008 | Kalkanoglu et al. | 442/74 |
| 2002/0114940 A1* | 8/2002 | Clemens et al. | 428/318.4 |
| 2005/0072110 A1* | 4/2005 | Shiao et al. | 52/741.1 |
| 2005/0072114 A1* | 4/2005 | Shiao et al. | 52/782.1 |

* cited by examiner

*Primary Examiner* — Maria Veronica Ewald
*Assistant Examiner* — Nathan Van Sell
(74) *Attorney, Agent, or Firm* — Tarter Krinsky & Drogin LLP

(57) ABSTRACT

A roofing product with a higher reflectivity is provided having a roofing material, and fine granules adhered to the roofing materials that are double-coated with a coating having a white pigment. A top white coating composition can be applied to the granules after the granules are applied to a roofing material. Further, a process of manufacturing a roofing product is provided, where fine granules that are double-coated with a coating having a white pigment are applied to a roofing material, and a top coating composition is then applied to the fine granules.

25 Claims, 1 Drawing Sheet

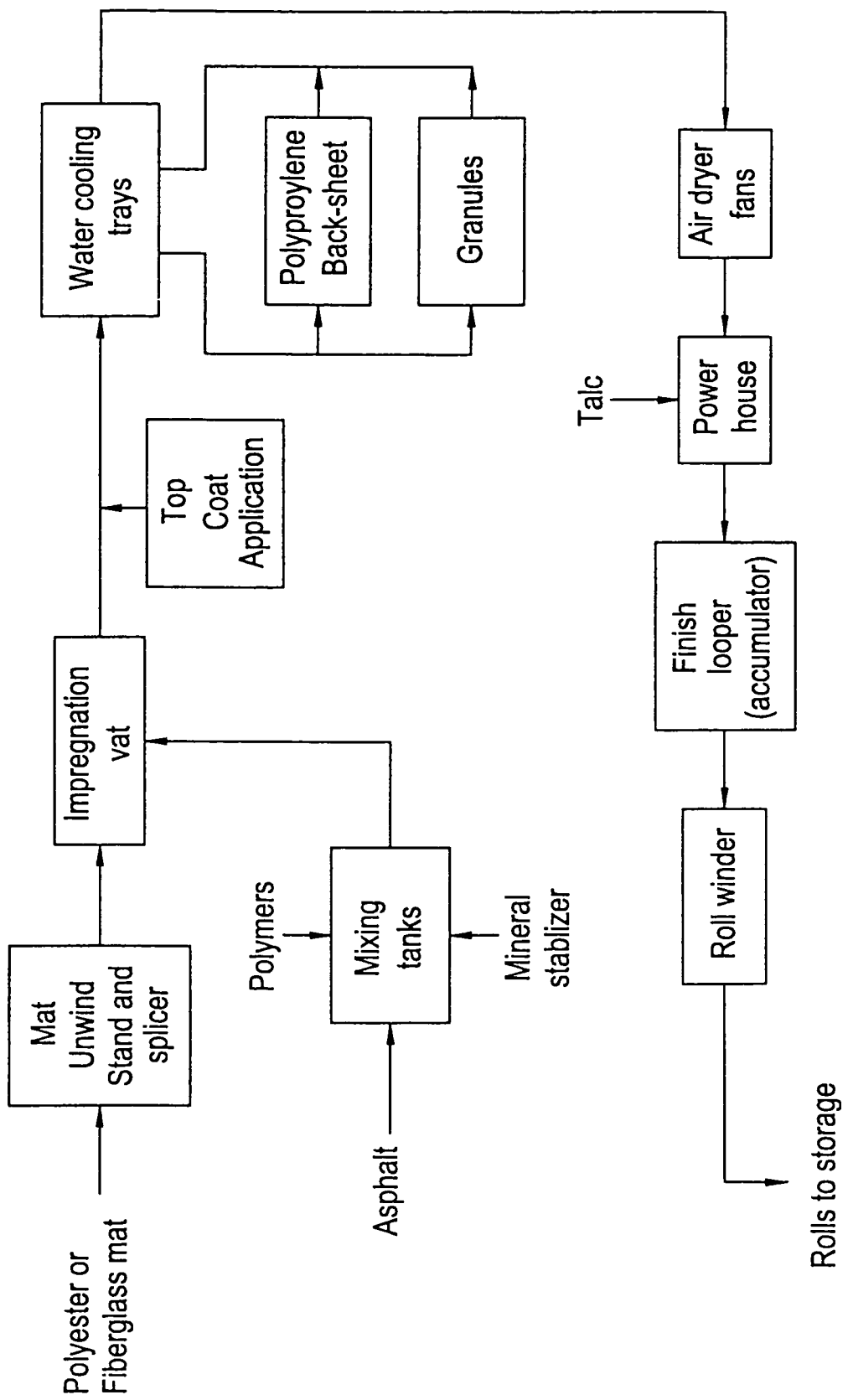

ROOFING PRODUCTS INCLUDING GRANULES WITH REFLECTIVE COATING

RELATED APPLICATIONS

This application is a continuation-in-part (CIP) of U.S. Ser. No. 10/851,602, filed May 21, 2004, the entire content of which is incorporated herein by reference.

FIELD OF THE INVENTION

The present invention relates to a new and useful laminate composition and a method for applying the laminate, and more specifically, to a reflective laminate film composition for roll roofing products that is applied during the manufacturing process.

BACKGROUND OF THE INVENTION

Modified bitumens were developed in Europe during the late 1960's for roofing applications and found a market in the United States during the 1980's. These products are an important part of the roofing industry and are produced as a continuous sheet on a roofing line and are later cut down to individual pieces and wound in rolls of various lengths. Subsequent to laying on a roof, they are top coated with coatings that provide energy efficacy and reflectivity.

With prior art white reflective coatings problems have occurred in maintaining roof surface reflectivity. Reflectivity decreases the most during the first year of a roof's life. After three years, the rate that reflectivity declines is typically less significant. Changes in reflectivity are primarily related to changes with the coating itself (e.g., coating erosion or cracking) and/or minimally related to accumulation of particulate matter (e.g., dirt) from atmospheric fallout. Depending on the geographic exposure and how well roof surfaces drain, keeping roof surfaces white and preventing premature failure from cracking and peeling can be a significant challenge and result in major maintenance expenditures for owners. Maintaining reflectivity may involve regular cleaning, regular restoration of reflective coatings, and regular application of biocides and/or fungicides. There remains a need for improved coatings with greater reflectivity, energy efficacy and durability.

Prior art coatings are applied directly to granule-surfaced modified bitumen roof membranes on new roof systems or as restorative coatings. Examples of such coatings are found in U.S. Pat. No. 6,060,555. However, granules are difficult to coat because of their rough, uneven surface areas. Moisture and air pockets can be trapped under the coating and lead to blisters or pinholes in the cured coating. Consequently, application of a compatible primer to the granule surface before coating application is required. Inconsistent coverage and potential cracking of areas where the coating is applied too heavily are additional problems related to application of previous coatings. Hence, there is a need for a method for top coating application that consistently results in uniform thicknesses of the coating.

Prior art coatings require application to the roofing membrane subsequent to placement of the modified bitumen membranes. Most coatings are recommended to be applied a few days, and sometimes as much as 60 days later on AAP modified products, after installation of the roofing membrane, which extends the time needed for prompt completion of the roofing project. Application requires special equipment such as a pressure washer, paddle mixer and spray rig as well as personal protective equipment. Pressure washing removes embedded dirt, chalking, carbon black and poorly adhered material. A paddle mixer is required as the coating must be completely stirred to ensure proper polymer dispersion because the solids may have settled at a container's bottom. Hence, there is a need for coating compositions that can be easily and effectively applied without the need for special equipment.

Certain coatings, such as acrylic coatings develop strength and adhesion as they cure during installation. When an acrylic coating is applied, two physical changes must occur: water must evaporate from the applied coating film for initial drying and acrylic polymers must fuse together for final cure. Consequently, for application purposes multiple thin coats promote water evaporation, polymer dispersion, and help eliminate pinholes, voids or thin spots.

Application of water-based acrylic coatings is influenced by changing weather conditions. Virtually all parts of North America have some application limitations as a result of cold weather, daily rainstorms, high humidity and/or fog, or reduced daylight hours during winter. Rain on an uncured coating will cause a partial or total coating run-off. Problems occur when an acrylic coating is specified on a construction project without regard to the time of year the coating is to be installed.

Additionally, two or more successive coats of the coating are often necessary. Further, the drying of the coating is influenced by weather conditions. Cold temperatures and lack of sunlight decrease the freshly applied coating's evaporation. Water in the coating film closest to the membrane diffuses through slowly. Coatings exposed to water conditions during the drying or coating period may soften, lift and debond from the surface. This often requires cleaning of the surface and reapplication of the coating. The final cure takes place during the first few weeks after application and is essential to the coating's long term performance. Wet weather and cooler temperatures inhibit final cure and may inhibit proper fusing. Consequently, acrylic coating applications cannot be attempted on roofing projects from late fall to early spring in most North American areas.

Film laminate coatings cannot be directly applied to asphaltic compounds because of inter alia difficulties due to heat sensitivities of the film, potential for delamination of the film caused by exudation of oil from modified bitumen membranes, and discoloration of the film due to exudation of oil. U.S. Pat. No. 5,096,759 discloses a membrane containing a laminated top aluminum foil surface and a bottom bitumen coating surface. However, foil materials typically have very smooth surfaces, which may provide insufficient surface area for binding, and therefore could delaminate from the surface of the asphaltic compound after cooling of the roofing membrane. Moreover, use of a thin layer of aluminum can cause the surface film laminate to fail by erosion or damage due to traffic. Conversely, use of a thicker foil increases cost in addition to posing other problems such as the product becomes very rigid and difficult to handle. Importantly, foil will not meet Energy Star® requirements.

Hence, there is a need for new and improved laminated coating compositions that may be applied in-plant during manufacture of the roll roofing membrane. In particular, a coating composition is needed that is reflective, energy efficient (meeting today's Energy Star® criteria) as well as durable and easy to apply, and which is not vulnerable to the effects of moisture and cold temperatures during the curing process.

Roofing granules, both natural and artificially color-coated granules, are extensively used in roll roofing and asphalt shingle compositions. The roofing granules are typically embedded in the asphalt coating on the surface of an asphaltimpregnated felt base material, the granules thus forming a coating that provides a weather-resistant exterior roofing surface. In addition to weather-resistance, the color-coated granules also provide an esthetic effect observable with respect to the coating compositions; the appearance of the granules is of major marketing interest. For this reason, a pigmented color coating is ordinarily applied to the base mineral granules. In addition to pigments, the granule coatings may contain additives such as algaecides to help extend the color and appearance of the roofing material. Roofing granules are generally used in asphalt shingle or in roofing membranes to protect asphalt from harmful ultraviolet radiation.

Roofing granules typically comprise crushed and screened mineral materials, which are coarse and are subsequently coated with a binder containing one or more coloring pigments, such as suitable metal oxides. The binder can be a soluble alkaline silicate that is subsequently insolubilized by heat or by chemical reaction, such as by reaction between an acidic material and the alkaline silicate, resulting in an insoluble colored coating on the mineral particles. The granules are then employed to provide a protective layer on asphaltic roofing materials such as shingles, and to add aesthetic values to a roof.

Pigments for roofing granules have usually been selected to provide shingles having an attractive appearance, with little thought to the thermal stresses encountered on shingled roofs. However, depending on location and climate, shingled roofs can experience very challenging environmental conditions, which tend to reduce the effective service life of such roofs. One significant environmental stress is the elevated temperature experienced by roofing shingles under sunny, summer conditions, especially roofing shingles coated with dark colored roofing granules. Although such roofs can be coated with solar reflective paint or coating material, such as a composition containing a significant amount of titanium dioxide pigment, in order to reduce such thermal stresses, this utilitarian approach will often prove to be aesthetically undesirable, especially for residential roofs.

Further, traditional granules used on roofing substrates such as modified bitumen products and built up roofing products are single-coated, coarse and large. Therefore, once a top coating is applied to these granules once adhered to the roofing products, the reflectivity provided by these granules is not sufficient to pass ASTM standards, and other high standards required by certain states. Thus, there is a continuing need for roofing granules that provide increased solar heat reflectance to reduce solar absorption.

SUMMARY OF THE INVENTION

The present invention provides an improved laminate composition for use in roofing products that provides energy efficacy, greater reflectivity, greater adherence, and a method of manufacture whereby the coating is applied during manufacture of the roll roofing membranes. The reflectivity provided by the inventive laminate composition, meets today's Energy Star® standards. Additionally, the roofing product produced is flexible enough to allow the product to be rolled without cracking, yet is sufficiently puncture and scuff resistant to adequately protect the laminate.

The roof coating of the invention is a white reflective laminate that adheres well to various roof substrates, particularly modified bitumen membranes and remains adhered even under severe water-ponding conditions.

The method of the present invention involves applying the laminate that is adhered to roofing membranes during the manufacture of the roof membrane obtained via the extrusion processes to the roll roofing membrane while it is still hot exiting the formation line where it is produced, resulting in heat activated curing and adhesion to the membrane.

The method of the present invention results in application of a laminate of appropriate and uniform thickness.

The resulting coated roof has an initial solar reflectance and a maintained solar reflectance that meets today's Energy Star® criteria. The resulting coated roof of the present invention achieves greater reflectivity than that achievable with coatings applied subsequent to placement of the membranes on site.

The energy efficacy of the laminate is determined by its solar reflectance. Solar reflectance by definition is the fraction of solar flux reflected by a surface expressed as a percent or within the range of 0.00 and 1.00.

The laminate composition of the present invention comprises a dispersion of plastic resins and a pigment. Plastic resin coatings have traditionally been used as a food wrap prepared by extrusion processes. It has surprising been discovered that this laminate is useful for modified bitumen membranes. The roofing products thus produced in accordance with the present invention will possess greater reflectivity, adherence and durability.

The present invention is also related to the film, i.e. top coat, which is formed from the top coating composition of the present invention as well as roofing products that are coated with the same.

The laminate of the present invention is applied in-plant during manufacture of the roll roofing membranes in order to achieve a higher reflectivity. Application in-plant results in greater strength and adhesion to the roofing membrane. Application in-plant also results in coating of modified bitumen membranes with ease and maximum efficacy.

The present invention also provides a roofing product comprising a roofing material, and fine granules adhered to the roofing materials that are double-coated with a coating having a white pigment. A top coating composition can be applied to the granules on the roofing material. The roofing material comprises single ply membranes, built-up roofing (BUR), modified bitumen, ethylene propylene diene monomer rubber (EPDM), atactic polypropylene (APP), styrene butadiene styrene copolymer (SBS) or standing-seam profile.

Further, a process of manufacturing a roofing product is provided, comprising applying fine granules that are double-coated with a coating having a white coating on a roofing material, and applying a top coating composition to the fine granules.

BRIEF DESCRIPTION OF THE DRAWING

FIG. 1 is a flow diagram of the production of the laminated modified bitumen membrane of the present invention.

DETAILED DESCRIPTION OF THE INVENTION

As indicated above, the present invention provides laminate compositions for roofing products that provides energy efficacy, durable exterior protection, is highly reflective to solar energy, and which is applied during the manufacture of the roll roofing membrane. The highly reflective nature of the laminate composition of the present invention provides a solar reflective coating that minimizes energy expended in air conditioning and levels temperature within a building structure.

The laminate coating is applied to the roll roofing membrane and heat melted during the manufacture of the roll roofing membranes. The heat of the roof membrane activates the coating to coagulate and bond to the underlying membrane. The coated membrane thus produced is allowed to cure during the manufacture of the roll roofing membranes. It becomes inseparable with the modified bitumen membranes and is then wound in spiral rolls and cut to appropriate sizes. The invention reduces the time and labor involved with coating application.

The plastic laminate coating is produced via extrusion processes on an extrusion line. Generally, extrusion involves forcing a viscous material through a die typically comprising an inlet, a cavity, and an exit. The end product of the extrusion process is a sheet comprising a single layer of polymeric material. Alternatively, the coating may be composed of coextruded layers of a multi-layer 6 sheet. Extrusion and coextrusion processes of the present invention include, but are not limited to, blown bubble extrusion, extrusion casting, profile extrusion, injection molding, extrusion coating and extrusion sheet.

The inventors have surprisingly found that plastic films traditionally used in the food and household wrap industry are useful as laminate top coatings for modified bituminous membranes. Such plastic films incorporated with pigment have the desired elasticity, processability, mechanical, and reflective properties for top coatings for modified bituminous membranes.

The manufacture of modified bitumen membranes consists of six major operations: (1) mixing asphalt with either atactic and isotactic polypropylene or styrene-butadiene-styrene and a mineral stabilizer in large heated tanks (356° F.; 180° C.), (2) applying the mixture to a polyester or fiberglass mat-based webbing, (3) applying a polypropylene backing or mineral surfacing (top and bottom), (4) cooling and drying, (5) product finishing (seal-down strip application, cutting and trimming) and, (6) packaging. Step (4), the cooling process occurs by passing the product around water-cooled rollers in a looper arrangement. Usually, water is also sprayed on the surfaces of the sheet to speed the cooling process.

The coating of the present invention is applied to the modified bitumen membranes as they exit the formulation line and prior to cooling. Modified bitumen membranes as they exit the formulation line are at a temperature between 125° F. and 160° F. (52° C.-72° C.). Cooling occurs in the finished product looper so that the membrane is approximately less than 100° F. (38° C.) at the winder. The total amount of heat to be removed is 2.1 million BTU (0.53 million Kcal per hour). The heat quantity to be removed is proportional to membrane thickness; thinner membranes can be produced at higher line speeds than thicker membranes.

According to the present invention, in lieu of spraying with water to cool, the top coat is applied in a single yet efficient application. Via heat fusion or thermosetting the top coating adheres to the membrane. The modified bitumen membrane is then allowed to cool, passed through a finish looper (accumulator) and is wound on a mandrel, cut to the proper length, and packaged. The process is depicted in FIG. 1.

The method of the present invention allows for continuous top coating application for large strip areas of modified bitumen roll roofing. The coating is flexible enough to allow the modified bitumen membrane to be rolled without cracking, sufficiently puncture and scuff resistant to adequately protect the coating.

The method of the present invention minimizes variations in coating thicknesses and results in application of the top coating in uniform thicknesses. To further insure uniform thickness, the present invention further comprises various speed controls, so that an appropriate thickness can be applied.

The method of the present invention results in a laminated film coating having a thickness of from about 1 to about 12 mils, more typically form about 1 to about 10 mils.

The method of the present invention avoids the drawbacks of coating existing bitumen membranes by applying and curing the coatings on site. The method avoids cumbersome transport and storage or the coating on site. No labor for installation and cleanup is required and installation is time efficient.

The coating composition of the present invention includes a mixture of a laminate of plastic film and a pigment, typically a whitening agent.

The mixture of the present invention has an initial reflectivity of at least 75% ASTM C1549 or E903 and a solar reflectance of at least 50% after three years exposure.

Modified bitumen roof systems are defined as polymer-modified bitumen membranes and a base sheet, reinforced with plies of fiberglass, polyester or a combination of both.

A laminate coating composition is defined as a coating in the form of a laminate that does not use a volatile solvent or water. For the purpose of the present invention, the terms laminate and coating or top coating are used interchangeably throughout.

The polymer-modified bitumen membrane is modified with a polymer selected from, but not limited to, atactic (amorphous) polypropylene, polypropylene-ethylene copolymers, polyvinyl toluene (PVT), polyethylene, polyoxyethylene, styrene, butadiene-styrene block copolymer (SBS), styreneethylene-butylene-styrene block copolymer (SEBS), and styrene-isoprene-styrene block copolymer (SIS).

Reflectivity is defined as the fraction of radiant energy that is reflected from the white roofing surface. The higher the amount of reflectivity the cooler the roof has the capability of being.

Wet mil thickness is defined as the amount of coating applied to the roofing substrate equal to one thousandth of an inch while the coating is still hot.

Extrusion is defined as the process of forming continuous shapes by forcing a molten plastic material through a die, followed by cooling or chemical hardening. Immediately, prior to extrusion through a die, the relatively high viscosity polymeric material is fed into a rotating screw of variable pitch, which forces it through a die.

Co-extrusion is defined as the process of extruding two or more materials through a single die with two or more orifices arranged so that the extrudates merge and weld together into a laminar structure before cooling.

The term "plastics" as used herein should be understood as referring not only to the basic polymer but also such materials in which the basic polymer is mixed with additives improving its properties, particularly plasticizers. The term "plastic" and "plastic resin" are used interchangeably throughout.

The laminate top coating composition has at least one layer comprising a blend of at least one synthetic resin or film, such as, but not limited to, polyvinyl chlorides (PVCs), polyolefins, such as, polyethylene, polypropylene, poly(butylenes), polybutylene and polyethylene terephthalates, polyester, aromatic polyesters, polycarbonate, polyvinyl alcohol, polyvinyl toluene (PVT), acrylic resin, ethylene-vinyl acetate copolymer, chlorinated polyethylene, polyamides, polyimides, polyetherimides, cellulosics, poly(arylate), liquid crystal polymers, blends, alloys of the foregoing resins, polyethers, polycyclopentanes, polymethylpentane and any copolymers thereof.

As used herein, the term "polyolefin" refers to homopolymer and copolymers of alpha-olefins having from 2 to about 8 carbon atoms, such as high density polyethylene, low density polyethylene, linear low density polyethylene, and polypropylene.

Of the materials mentioned above, it is preferred to use polyethylene, polypropylene, PVT or PET.

These materials are made using techniques well-known in the art including, for example, polymerization of at least one monomer in the presence of a suitable polymerization catalyst such as metallocene or Ziegler/Natta catalyst; extrusion molding and cutting.

Combinations and/or multilayered stacks of such plastic films are also contemplated herein.

The other component of the inventive top coating composition is a pigment. The pigment employed in the present invention can be any pigment that is capable of providing a highly reflective coating after the resultant mixture is cured. Typically, the pigment provides a coating that is white in color. Various shades of white are also possible as well as other colors that are capable of providing a coating that is highly reflective.

Suitable pigments that can be employed in the present invention include, but are not limited to: titanium dioxide, calcium carbonate, colemanite, aluminum trihydrate (ATH), borate compounds, and mixtures thereof. One highly preferred pigment employed in the present top coating composition is titanium dioxide, which produces a white color. The coating can be formulated in a variety of colors to conform to building aesthetics.

The pigments are employed in an amount from about 1 to about 20 wt. %, with an amount from about 4 to about 15 wt. % being more typical for one of the aforementioned pigments.

The ratio of pigment to binder of the coating formulation is in the range of about 1:5 to 1:10, preferably 1:6.5 to 1:8.5.

The energy efficacy of the coating is determined by measuring its initial solar reflectance using ASTM E903 (Standard test method for solar absorptance, reflectance, and transmission of materials using integrated spheres). Alternatively, the initial solar reflectance can be determined by ASTM C 1549 (Standard test method for determination of solar reflectance near ambient temperature using a portable reflectometer).

In addition to having the aforementioned initial solar reflectance values, the coating of the present invention needs to be capable of maintaining a solar reflectance for three years after installation on a low-sloped roof under normal conditions of greater than or equal to 0.50 (measured from the first year after installation). For steep-sloped roofing products, the top coating of the present invention has to maintain a solar reflectance for three years after installation under normal conditions of greater than or equal to 0.15 (measured from the first year after installation).

Maintenance of solar reflectance of a roofing product can be determined using the current guidelines mentioned in the Energy Star® program requirements manual. The test can be carried out using ASTM E 1918 or ASTM C 1549 for low-sloped roofing products. ASTM C 1549 can be used in the case of steep-sloped roofing.

The coating composition of the present invention, which comprises a mixture of at least the above-mentioned components, may also include other optional components that are typically employed in top coating compositions. For example, the coating composition of the present invention can include any of the following components:

polymer binders;
dispersants such as potassium tripolyphosphate, acrylic polymers or copolymers, and the like;
defoamers that are capable of preventing foaming;
fillers such as calcium carbonate, talc, white sand, colemanite, and the like;
solvents that are capable of serving as a coalescing agent such as ethylene glycol, propylene glycol, alcohols, and the like; preferred is ester alcohol which is a slow evaporating, water
insoluble coalescing aid.
microbiocides that serve as fungicides, e.g., zinc oxide;
thickening agents such as hydroxethyl cellulose, polyurethane, and the like;
fire retardants such as alumina trihydrate, zinc borate, alkali metal silicates, and the like;
polymeric carriers;
pH modifiers such as aqueous ammonia;
wetting agents such as siloxanes;
light stabilizers such as hindered mines; and/or
adhesion promoters such as hydrocarbon resins
UV stabilizers.

The optional components mentioned above are present in the coating composition of the present invention in amounts that are well known to those skilled in the art.

The laminate of the present invention can also be corona treated to provide greater affinity of the film to attach to the asphalt membrane.

The coating composition of the present invention is prepared by first providing a laminate dispersion of at least the synthetic resin or film, the pigment and the other optional ingredients in an extruder and led to a die. Mixing occurs via melt-kneading in the extruder.

The mixing provides a laminate blend of components that can be applied immediately to a surface of a building materials product or the resultant mixture can be stored for several weeks or month prior to application.

The laminate blend can be applied in a batch or continuous process. In a batch process, the modified bitumen membrane is stationary during each treatment step of the process, whereas in a continuous process the modified bitumen membrane is in continuous movement along an assembly line. The present invention will now be discussed generally in the context of laminating a modified bitumen membrane along an assembly line process, although the process is also useful for laminating roofing membranes in a batch process.

The resultant laminate composition of the present invention can be applied to any substrate, especially roofing products or other related building materials products, by side extrusion coating, spray coating, dip coating, knife coating, roll coating or a film application such as lamination heat pressing and other like coating procedures. The top coating composition may also be bonded to the modified bitumen membranes by chemical bonding, mechanical bonding and/or thermal bonding. Each of the above-mentioned methods are well known to those skilled in the art; therefore a detailed description concerning the specifics of the methods are not needed herein.

After applying the coating composition of the present invention to a surface of a substrate, the coating composition is cured at the temperature of the environment in which the coated substrate is located. Curing can take place in just a few minutes or longer depending on the thickness of the applied coating as well as the environmental temperature.

The coating composition of the present invention is generally applied to the exterior surface of a substrate. In particular, the coating composition is generally applied to an expose exterior surface of a roofing product including low-sloped roofing products such as single ply membranes, built-up roofing (BUR), modified bitumen, ethylene propylene diene monomer (EPDM) rubber and standing-seam profile metal roofing, or steep sloped roofing products such as composite shingles, clay, concentrate, fiber cement tile, slate, shakes, architectural profiled metal and individual roofing components. In some preferred applications, the coating composition of the present invention is applied to BUR surfaces, modified bitumen and EPDM rubber.

After application and curing, a laminate is provided to the substrate that provides durable protection to the substrate from abrasion, impact, water, and other environmental factors. Moreover, the laminate provided by the present invention is capable of extending the lifetime of the current roofing system. The top coat provided in the present invention is also breathable meaning that it has excellent porosity, which allows for venting of vapors.

The roofing material of the present invention also includes a reinforcement (i.e., glass/polyester/scrim or combination thereof) that is saturated in the asphalt compound. As discussed, the saturated sheet is then subjected to fine granules which are applied directly on to the saturated sheet. The sheet is then coated with the top white coating composition.

In addition to the foregoing properties, the laminate that is formed using the inventive composition has a high reflectivity that meets and even may exceed current Energy Star® values.

While the laminate of the present invention is directed to modified bitumen roof membranes, such as APP and SBS polymer modified bitumens, it is understood that it may be applied to other roof systems such as, but not limited to, granule- and mineral-surfaced modified bitumen cap sheets, metal roof systems, masonry surfaces, build-up roof (BUR) systems (BUR systems consist of bitumen and ply sheets applied in multiple layers, hence the term "built-up"), EPDM, PVC, HypalonQ and substrates such as spray polyurethane foam (SPF).

The coating can be applied in a laminate state at a specified application rate which results in a coating thickness of between about 0.5 to about 12 mils; more typically from about 1 to about 10 mils. For all application purposes, the laminate can be applied in two or more thin coats or one thick coat.

The coating may be applied by spray, brush or roller. According to the present invention, spraying is preferred. The use of spray equipment comprises: a source means for providing a supply of the laminate coating; a pump means for pumping such coating; and a spray means for spraying such coating. A spray pump capable of developing 1,800-psi material output pressure should be sufficient to spray the coating of the present invention. Alternatively, hydraulic or pneumatic pumps may be used.

The coating of the present invention may be used with or without surface priming.

The coating of the present invention is applied to the modified bitumen roll roofing membrane during manufacture. Alternatively, the coating may be applied to the roof and cured in situ or "manufactured in place.

The coating composition of the present invention includes a mixture of a polymeric binder, heat expandable graphite particles, a polymeric carrier and an effective amount of a pigment that is capable of providing a coating that has an initial energy efficiency rating greater than or equal to 0.65 for a low-sloped roof, or an initial energy efficiency greater than or equal to 0.25 for a steep-sloped roof, wherein the mixture has a solids content from about 50-75% of which 1-10 wt. % is said expandable graphite particles.

In accordance with the present invention, the polymeric binder employed in the present invention is any thermoplastic polymer or thermoplastic rubber that is capable of forming a film upon curing. The polymeric binders employed in the present invention are typically in latex form. Suitable polymeric binders employed in the top coating composition of the present invention include, but are not limited to: acrylic or methacrylic polymers or copolymers, epoxy resins, polyvinyl acetate resins and thermoplastic rubbers such as styrene-butadiene rubbers, styrene-butadiene-styrene rubbers, styrene-ethylene-butadiene-styrene (SEBS) rubbers, styrene isoprene styrene (SIS) rubbers, and styrene butadiene rubbers (SBR).

In some embodiments, thermoplastic polymers, especially acrylic polymers or copolymers are employed as the polymeric binder of the top coating composition of the present invention. In other embodiments, a thermoplastic rubber such as SEBS is employed as the polymeric binder.

The type of polymeric carrier employed in the present invention is dependent on the type of polymeric binder used. For thermoplastic polymers, the polymeric carrier is typically water. When thermoplastic rubbers are employed as the polymeric binder, the polymeric carrier is a hydrocarbon solvent such as napthanol, mineral spirits, ketones, napthas and the like. The polymeric carrier is present in the inventive top coating composition in an amount from about 2 to about 40 wt. %, with an amount from about 6 to about 25 wt. % being more typical for thermoplastic polymers and rubbers.

The polymeric binder and the polymeric carrier form an aqueous polymeric-based emulsion or a solvent polymeric based emulsion. The polymeric binder is typically present in said mixture in an amount from about 5 to about 60 wt. %, and the polymeric carrier, which may be an acrylic polymer, is present in said mixture in an amount from about 30 to about 50 wt. %. The polymeric carrier may also be a thermoplastic rubber present in the mixture in an amount from about 8 to about 18 wt. %. The pigment according to the present invention is present in said mixture in an amount from about 2 to about 20 wt. %.

The granules used in the roofing materials of the present invention are smaller, finer white granules that are double-coated with a coating having a white pigment. Roofing granules, both natural and artificially color-coated granules, are extensively used in roll roofing and asphalt shingle compositions. Traditional granules applied to these products are single-coated with a white coating, and do not meet ASTM standards and other requirements such as Energy Star and Title 24 Requirements in California. The granules according to the present invention are coated with a first coat, dried, and then a second coating is applied. The resulting granules are white in color and uniformly coated.

It is known in the art that the use of fine white granules applied on the roofing materials provide more reflectivity than the traditional larger and coarser granules because the surface of the granules is smoother and less irregular. A smooth surface granule allows for a higher reflectivity versus a rough surface granule. Since the granules are smaller in size compared to traditional granules, not only is reflectivity higher, but less granules are used per square foot than with the traditional granules.

Granules according to the present invention utilizes ISP No. 18 Grade Bright White Roofing Granules (ISP 118-713) (International Specialty Products, Wayne, N.J.). The No. 18 Grade Bright White Roofing Granules have a fired granule appearance of 0.6 color units of standard for L, a, b, scales (ISP MP-23). Color permanence was demonstrated by long term performance in natural weather testing.

In a comparison with ISP White (711) and typical industry white granules, the ISP Bright White (713) granules showed significantly better reflectance as illustrated in the Chart 1:

CHART 1

| Product | Reflectance |
| --- | --- |
| ISP Bright White (713) | 42-64 |
| ISP White (711) | 36-39 |
| Typical Industry White | 27-29 |

The ISP No. 18 Grade Bright White Roofing Granules have a particle size is typically in the range of from approximately 1.70 mm to approximately 425 μm which are particle sizes capable of being sieved through standard ASTM 10-35 Tyler Sieves. The present invention provides for the combination of fine granules with the coating composition. The target granule screening grading (ASTM-D-451) is shown in Chart 2:

CHART 2

| Standard Sieve | | Percent Retained (Nominal Range) | |
| --- | --- | --- | --- |
| Tyler | U.S. | Minimum | Maximum |
| 10 | 12 | 0.0 | Trace |
| 14 | 16 | 0.0 | 6.0 |
| 20 | 20 | 2.0 | 26.0 |
| 28 | 30 | 48.0 | 76.0 |
| 35 | 40 | 4.0 | 32.0 |
| Pan | Pan | 0.0 | 6.0 |

In certain embodiments, the present invention is directed to a roofing product comprising: a top white coating composition on a roofing material; and fine granules adhered to the roofing material, said granules being double-coated with a coating composition having a white pigment; wherein said double-coated granules have a reflectivity of approximately 40%.

In certain embodiments, said double-coated granules having a top white coating composition applied thereon have a reflectivity in the range of 71% to 74%.

In certain embodiments, the present invention is directed to a process of manufacturing a roofing product, comprising: applying fine granules on a roofing material, said fine granules being double-coated with a coating composition having a white pigment; and applying a top white coating composition on said fine granules; wherein said double-coated granules have a reflectivity of approximately 40%.

In certain embodiments, the present invention is directed to a process of manufacturing a roofing product, wherein the roofing product has a reflectivity in the range of 71% to 74%.

While the invention has been described for use in roofing materials, it is also usable for coating applications on siding or at ground level such as for pavement painting or sealing applications.

Example 1

The asphalt is heated to approximately 400° F. Polymer is added and high shear mixed. Fillers are added under low shear. The asphalt compound thus made undergoes Quality Control approval. It is then pumped to the production line. The asphalt compound is saturated in reinforcement. The film laminate is adhered at approximately 230° F. The combination is cooled under water, dried and rolled up in 100 square feet.

The fine white granules of the present invention provide for a higher reflectance than the traditional single-coated granules. Table 1 below shows readings of two different samples of traditional white granules, compared to readings of two different samples of the fine white double-coated granules of the present invention. The reflectivity was measured using a SSR instrument (ASTM C-1549 approved method). Reading 1 was taken in the upper left corner of the sample. Reading 2 was taken in the lower left corner of the sample. Reading 3 was taken in the upper right corner of the sample. Reading 4 was taken in the lower right corner of the sample. Reading 5 was taken in the center of the sample.

TABLE 1

| Product | Reading 1 | Reading 2 | Reading 3 | Reading 4 | Reading 5 | Average Reflectivity |
| --- | --- | --- | --- | --- | --- | --- |
| Traditional (1) | 28.00% | 29.50% | 28.50% | 30.00% | 29.80% | 29.16% |
| Traditional (2) | 28.20% | 29.70% | 28.00% | 29.40% | 28.40% | 28.74% |
| Double-Coated (1) | 41.20% | 39.70% | 40.50% | 39.90% | 40.50% | 40.36% |
| Double-Coated (2) | 40.90% | 40.50% | 39.90% | 41.50% | 41.20% | 40.80% |

As can be seen, the finer double-coated white granules had a reflectivity of approximately 40%, as compared to the single-coated traditional granules that had a reflectance of 28%. The double-coated fine granules had a higher reflectivity, as a result of the second coat.

The reflectivity of the fine double-coated white granules was measured again after the top coating composition was applied to the double-coated fine white granules. Table 2 below shows readings of two different samples of the traditional granules after a top white coating composition was applied, compared to readings of two different samples of the fine white double-coated granules of the present invention after the top white coating composition was applied. The reflectivity was measured using a SSR instrument (ASTM C-1549 approved method). Reading 1 was taken in the upper left corner of the sample. Reading 2 was taken in the lower left corner of the sample. Reading 3 was taken in the upper right corner of the sample. Reading 4 was taken in the lower right corner of the sample. Reading 5 was taken in the center of the sample.

TABLE 2

| Product | Reading 1 | Reading 2 | Reading 3 | Reading 4 | Reading 5 | Average Reflectivity |
|---|---|---|---|---|---|---|
| Traditional (1) | 62.50% | 63.10% | 61.90% | 63.00% | 61.90% | 62.48% |
| Traditional (2) | 60.50% | 59.90% | 62.90% | 61.80% | 62.00% | 61.42% |
| Double-Coated (1) | 72.80% | 74.20% | 73.00% | 73.80% | 72.40% | 73.24% |
| Double-Coated (2) | 71.90% | 74.50% | 74.50% | 73.90% | 73.80% | 73.72% |

The results show the reflectivity went up to above 70%, which is the current California standard, with a range of 71% to 74%, when the top white coating composition of the present invention was applied to the granules on the roofing material. Traditional single-coated granules showed reflectivity of approximately 60% after the top white coating was applied to the granules on the roofing material.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A roofing product comprising:
   (a) a roofing material having a laminate coating composition applied during manufacture of said roofing material, said laminate coating composition comprising a dispersion of a plastic film resin and a white pigment;
   (b) fine granules adhered to the roofing material, the fine granules being double-coated with said laminate coating composition before application of said granules to said roofing material; and
   (c) a top coating of said laminate composition applied onto (a) and (b);
   wherein the double-coated fine granules having the top coating composition applied thereon have a reflectivity above 70% when measured using an SSR instrument (ASTM C-1549 approved method).

2. The roofing product of claim 1, wherein said fine granules are sized in the range from approximately #10 mesh to approximately #35 mesh.

3. The roofing product of claim 2, wherein said fine granules are sized in the range from approximately 1.70 mm to 425 μm.

4. The roofing product of claim 1, wherein said double-coated granules having a top coating composition applied thereon have a reflectivity in the range of 71% to 74%.

5. The roofing product of claim 1 wherein said roofing material comprises single ply membranes, built-up roofing (BUR), modified bitumen, ethylene propylene diene monomer rubber (EPDM), atactic polypropylene (APP), styrene butadiene styrene copolymer (SBS) or standing-seam profile.

6. The roofing product of claim 1, wherein said top white coating composition comprises a mixture of a polymeric binder, heat expandable graphite particles, a polymeric carrier and an effective amount of a pigment that is capable of providing a coating that has an initial energy efficiency rating greater than or equal to 0.65 for a low-sloped roof, or an initial energy efficiency greater than or equal to 0.25 for a steep-sloped roof, wherein said mixture has a solids content from about 50-75% of which 1-10 wt. % is said expandable graphite particles.

7. The roofing product of claim 6, wherein said polymeric binder is a thermoplastic polymer or a thermoplastic rubber.

8. The roofing product of claim 7, wherein said polymeric binder is a thermoplastic polymer selected from the group consisting of acrylic or methacrylic polymers or copolymers, epoxy resins, and polyvinyl acetate.

9. The roofing product of claim 6, wherein said polymeric binder is a thermoplastic rubber selected from the group consisting of styrene-butadiene rubbers, styrene-butadiene-styrene rubbers, styrene-ethylene-butadiene-styrene (SEES) rubbers, styrene isoprene styrene rubbers, and styrene butadiene rubbers.

10. The roofing product of claim 6, wherein said polymeric carrier is water or a hydrocarbon solvent.

11. The roofing product of claim 6, wherein said pigment is selected from the group consisting of titanium dioxide, calcium carbonate, colemanite, aluminum trihydrate (ATH), and borate compounds, as well as mixtures thereof.

12. The roofing product of claim 11, wherein said pigment is titanium dioxide.

13. The roofing product of claim 6, wherein said polymeric binder and the polymeric carrier form an aqueous polymeric-based emulsion.

14. The roofing product of claim 6, wherein said polymeric binder and the polymeric carrier form a solvent polymeric-based emulsion.

15. The roofing product of claim 6, wherein said polymeric binder is present in said mixture in an amount from about 5 to about 60 wt. %.

16. The roofing product of claim 6, wherein said polymeric carrier is an acrylic polymer that is present in said mixture in an amount from about 30 to about 50 wt. %.

17. The roofing product of claim 6, wherein said polymeric carrier is a thermoplastic rubber that is present in said mixture in an amount from about 8 to about 18 wt. %.

18. The roofing product of claim 6, wherein said pigment is present in said mixture in an amount from about 2 to about 20 wt. %.

19. The roofing product of claim 6, comprising one or more optional components selected from the group consisting of dispersants, defoamers, fillers, solvents, microbiocides, thickening agents, additional fire retardants, pH modifiers, wetting agents, light stabilizers, and adhesion promoters.

20. A process of manufacturing a roofing product, comprising:
   coating a roofing material with a laminate coating composition comprising a dispersion of a plastic film resin and a white pigment;
   double-coating fine granules with a further amount of said laminate coating composition applying said double-coating fine granules to said roofing material; and coating said double-coated fine granules with a further coating of said laminate coating composition to produce a roofing product having a reflectivity above 70% when measured using an SSR instrument (ASTM C-1549 approved method.

21. The process of claim 20, wherein said roofing material comprises single ply membranes, built-up roofing (BUR), modified bitumen, ethylene propylene diene monomer rubber (EPDM), atactic polypropylene (APP), styrene butadiene styrene copolymer (SBS) or standing-seam profile.

22. The process of claim 20, wherein said further coating comprises a mixture of a polymeric binder, heat expandable graphite particles, a polymeric carrier and an effective amount of a pigment that is capable of providing a coating that has an initial energy efficiency rating greater than or equal to 0.65 for a low-sloped roof, or an initial energy efficiency greater than or equal to 0.25 for a steep-sloped roof, wherein said mixture has a solids content from about 50-75% of which 1-10 wt. % is said expandable graphite particles.

23. The process of claim 20, wherein said fine granules are sized in the range from approximately #10 mesh to approximately #35 mesh.

24. The process of claim 23, wherein said fine granules are sized in the range from approximately 1.70 mm to 425 μm.

25. The process of claim 20, wherein said roofing product has a reflectivity in the range of 71% to 74%.

* * * * *